US010834952B1

(12) United States Patent
Jin et al.

(10) Patent No.: US 10,834,952 B1
(45) Date of Patent: Nov. 17, 2020

(54) BEVERAGE FORMULATION WITH REDUCED CARIOGENIC ACTIVITY

(71) Applicant: DoseBiome Inc., Toronto (CA)

(72) Inventors: Ted Jin, Toronto (CA); Jun Xin Jane Ong, Toronto (CA)

(73) Assignee: Bubble Qii Limited, Wan Chai (HK)

( * ) Notice: Subject to any disclaimer, the term of this patent is extended or adjusted under 35 U.S.C. 154(b) by 0 days.

(21) Appl. No.: 16/674,668

(22) Filed: Nov. 5, 2019

(51) Int. Cl.
*A23L 33/175* (2016.01)
*A23L 2/54* (2006.01)
*A23L 33/155* (2016.01)
*A23L 33/16* (2016.01)

(52) U.S. Cl.
CPC ............. *A23L 33/175* (2016.08); *A23L 2/54* (2013.01); *A23L 33/155* (2016.08); *A23L 33/16* (2016.08); *A23V 2002/00* (2013.01)

(58) Field of Classification Search
CPC ...... A23L 33/175; A23L 33/16; A23L 33/155; A23L 2/53

USPC .......... 426/590, 542, 650, 474, 548, 74, 656
See application file for complete search history.

(56) References Cited

U.S. PATENT DOCUMENTS

| 7,070,818 B1 * | 7/2006 | Nielsen et al. |
| 2009/0104312 A1 | 4/2009 | Kamarei et al. |
| 2010/0009052 A1 | 1/2010 | Canessa et al. |
| 2010/0015288 A1 | 1/2010 | Fukuda et al. |

FOREIGN PATENT DOCUMENTS

| CA | 2820022 | 6/2015 |
| EP | 0117653 | 7/1987 |
| JP | 2011182684 | 12/2011 |

* cited by examiner

Primary Examiner — Helen F Heggestad
(74) Attorney, Agent, or Firm — Susan Tandan; Gowlilng WLG (Canada) LLP

(57) ABSTRACT

A non-cariogenic carbonated beverage is provided comprising carbonated water, a food-grade basic buffer and at least one amino acid.

19 Claims, 3 Drawing Sheets

Effect of ratio of carbonate:bicarbonate on pH ratio KHCO3:K2CO3

Effect of ratio of carbonate:bicarbonate on pH

BEVERAGE FORMULATION WITH REDUCED CARIOGENIC ACTIVITY

FIELD OF THE INVENTION

The present invention generally relates to carbonated beverages, and in particular, to carbonated beverages with reduced cariogenic activity.

BACKGROUND OF THE INVENTION

Carbonated beverages, especially sodas, are harmful to teeth. This is due to their low pH and high titratable acidity that leads to dental erosion. In addition, their high sugar content leads to bacterial fermentation and production of acids that facilitate dental decay since teeth are susceptible to dental erosion at a low (acidic) pH. Specifically, dentin erodes at pH 6.5, while enamel erodes at pH 5.5.

Carbonated beverages on the market have a very low pH, with the pH ranging from 2.0 to 5.5. For example, COCA COLA CLASSIC (Cola) has a pH of about 2.37, while A&W Root Beer Diet has a pH of about 4.57. Even carbonated waters have a low pH of about 5.25. This acidic pH is due to the citric acid and phosphoric acid often added to the formulation of sodas, as well as the presence of carbonic acid resulting from the carbonation.

In addition, carbonated sodas on the market have a very high sugar content. For example, the sugar content of some sodas has been determined to be about 33 g (SCHWEPPES Ginger Ale), while others have an even greater sugar content of more than 40 g (CRUSH Grape Soda) per 12 oz serving. Even low-calorie sodas such as COCA COLA LIFE and PEPSI TRUE still contain a high level of sugar, at 24 g and 26 g, respectively, per 12 oz serving. While diet sodas have zero sugar, they contain artificial sweeteners that impart an unpleasant aftertaste. Furthermore, the use of artificial sweeteners is generally negatively perceived and unappealing to consumers.

In view of the foregoing, it would be desirable to develop a carbonated beverage that overcomes at least one disadvantage of prior carbonated beverages, for example, exhibits reduced cariogenic activity.

SUMMARY OF THE INVENTION

A novel carbonated beverage has now been developed which is less acidic, and thus, results in reduced cariogenic activity.

Thus, in one aspect of the invention, a carbonated beverage is provided comprising carbonated water, a food-grade basic buffer and at least one amino acid.

This and other aspects will become apparent in the detailed description that follows by reference to the following figures.

DETAILED DESCRIPTION OF THE INVENTION

Figure 1:
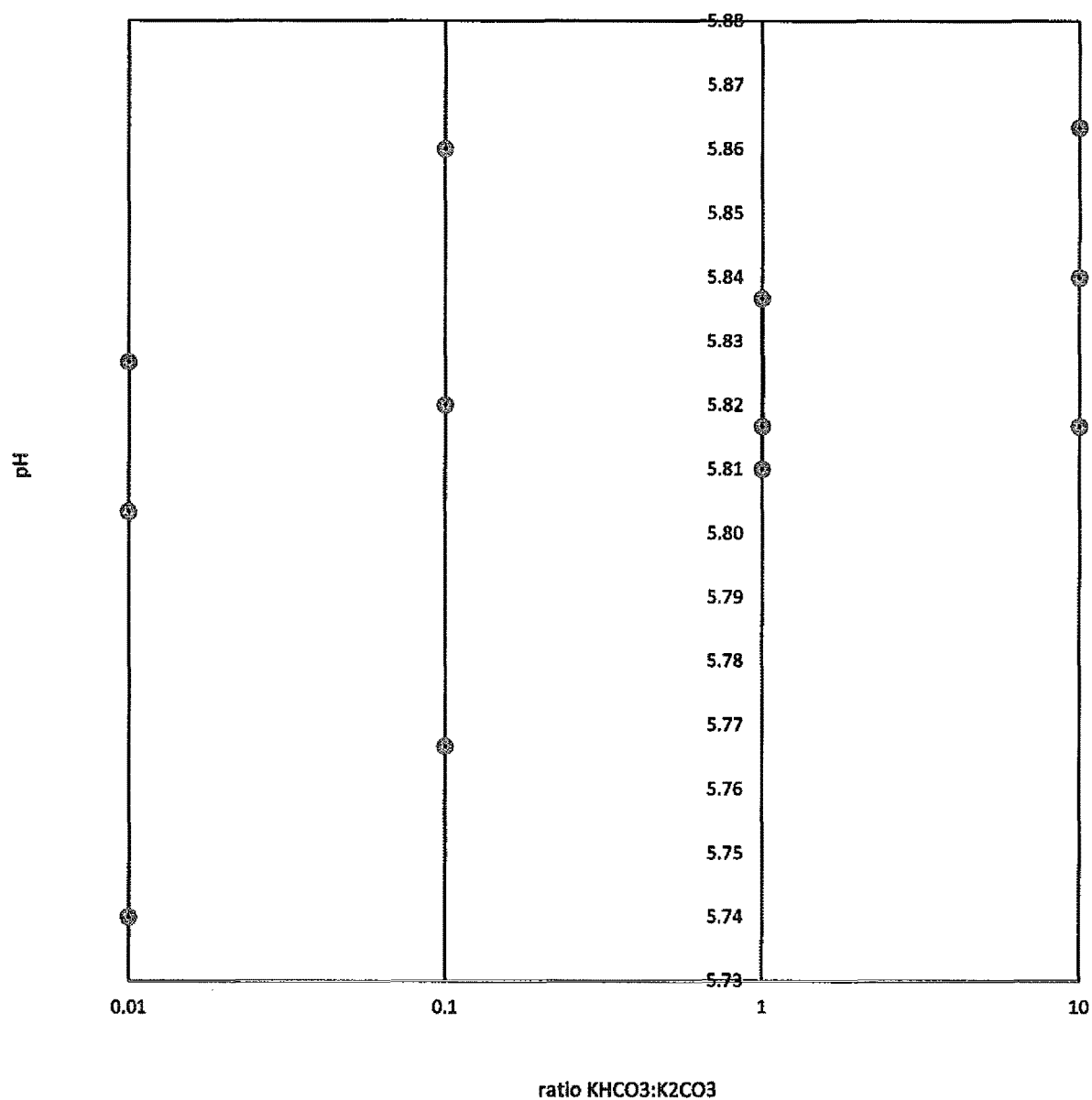
FIG. 1 graphically illustrates the effect of potassium carbonate to potassium bicarbonate ratio on the pH of carbonated solutions.

A carbonated beverage is provided comprising carbonated water, a food-grade basic buffer and at least one amino acid.

Carbonated water is water containing dissolved carbon dioxide gas, which results in the presence of small bubbles in the water giving it an effervescent quality. Water is generally carbonated by injection of carbon dioxide gas into the water under pressure. Carbonated water has a decreased pH due to the formation of carbonic acid following carbonation. To increase the level of carbonation in water, the water may be chilled, optimally to just above freezing to maximize carbonation. Higher gas pressure and lower temperature cause more gas to dissolve in the water. Carbonation levels may vary, depending on the beverage, in the range of 1 to 6 volumes of carbon dioxide per liquid volume. Carbonated beverages commonly possess a carbonation level of 2 to 4 volumes of carbon dioxide per liquid volume.

The present carbonated beverage is buffered to raise the pH of the beverage following carbonation with a food-grade basic salt. Examples of suitable buffers include potassium carbonate/bicarbonate, potassium citrate, sodium carbonate/bicarbonate, dipotassium phosphate, sodium phosphate and combination salts. Preferred buffers are potassium-based such as potassium carbonate/bicarbonate. The amount of buffer included in the present beverage is an amount that renders the beverage to have a pH of greater than 5.5, e.g. 5.6-6.0, while not exceeding an amount that has an undesirable effect on taste. In one embodiment, a potassium-based buffer may be included in the beverage in an amount in the range of about 0.25-0.75% by wt, or 25-75 mmol potassium/L of beverage. Preferably, the buffer is included in an amount in the range of about 0.30-0.60% by wt, or 30-60 mmol potassium/L of beverage.

The present carbonated beverage also comprises at least one amino acid to mask any undesirable flavour resulting from the buffer. Any amino acid that functions to mask the taste of the buffer, while not itself resulting in any adverse effect, e.g. an decrease in the pH of the beverage, or an undesirable taste or health concern, may be utilized. Preferred amino acids have an isoelectric point of greater than 5.5, e.g. 6 or greater. Examples of suitable amino acids include, but are not limited to, glycine, alanine, glutamine or combinations thereof. The beverage comprises an amount of amino acid in the range of about 0.5 to 2% by wt, or 5-20 g/L of the beverage.

As one of skill in the art will appreciate, the present carbonated beverage may optionally include other ingredients to enhance its flavour or to otherwise improve palatability or functionality. Such ingredients will generally be inert, non-cariogenic and non-fermentable.

In one embodiment, the beverage includes one or more additives that further prevent cariogenic activity. For example, the inclusion of calcium phosphate salts, such as dicalcium phosphate, function to drive equilibrium of hydroxyapatite in the enamel in favour of the solid state, thereby preventing or at least reducing its breakdown.

One or more additives that assist to strengthen teeth may be included in the present beverage. Examples include, but are not limited to, vitamins and minerals, such as Vitamin D (such as D2 or D3 which aid in calcium absorption), calcium, phosphorus (also aids in calcium absorption), fluoride, iodine (aids calcium absorption) and zinc (aids in the prevention of plaque build-up). Such additives may be added in amounts from trace to 0.1% by weight.

The beverage may also include an antioxidant. Examples of suitable antioxidants include Vitamin E and oolong tea extract. Antioxidants may be added in amounts varying from 0.01-0.50% by wt.

In a preferred embodiment, an antioxidant and Vitamin D (e.g. Vitamin D3) may be added to the present beverage.

The present carbonated beverage may include a sweetener. The sweetener is preferably non-cariogenic and non-fermentable so as to avoid the production of acids by bacteria in the mouth when the beverage is consumed. Examples of non-cariogenic sweeteners include non-nutritive sweeteners such as aspartame, sucralose, stevia (steviol glycosides), and monk fruit extract, as well as carbohydrates that are metabolized via different pathways such as xylitol, erythritol, glycerol, and allulose. The sweetener may be added to the beverage in an amount suitable to achieve the desired sweetness. The amount of such sweeteners will vary with the particular selected sweetener. Generally, the sweetener is added in an amount in the range of about 0.01 to 15% by wt, or 0.1 to 150 g/L. For example, suitable amounts of carbohydrate sweeteners are in the range of 1-15% by wt or 10-150 g/L, while amounts of non-nutritive sweeteners is in the range of about 0.01-1.0% by wt or 0.1-10 g/L.

The beverage may also include one or more flavours, providing that the flavour is non-cariogenic and non-fermentable. Examples of flavours that may be incorporated in the present beverage include fruit and vegetable essences such as berry, apple, orange, tomato and cucumber, floral notes such as rose and lavendar, botanical essence such as vanilla, herbal essences, sour or bitter flavours such as tamarind, spicy flavours such as ginger, savory flavours such as sage and rosemary, soft drink flavours such as cola, root beer, ginger ale, and the like. Flavours may be natural, or artificial in order to be both non-cariogenic and non-fermentable. Generally, flavouring may be added in an amount suitable to achieve the desired taste, preferably, an amount in the range of about 0.01-0.50% by wt or 0.10 to 5.0 g/L.

Other additives may include a preservative, such as any preservative suitable for use in a beverage. Examples include, but are not limited to, essential oils (orange oil, grape oil, clove oil, etc.), benzoates, sorbates, and others.

The beverage may also include a colouring agent, e.g. a dye and/or pigment suitable for inclusion in the beverage.

Embodiments of the invention are described by reference to the following specific example which is not to be construed as limiting.

Example 1

The following were conducted to develop a carbonated test beverage with a pH greater than 5.5 and without any cariogenic sweetener.

Method

Buffer Concentrations—

Optimal concentrations of base, such as potassium carbonate and bicarbonate, for inclusion in the beverage were determined. This was determined by measuring the effect of several variables on pH following carbonation of water, including the ratio of carbonate to bicarbonate and the moles of potassium. Another factor in choosing the optimal level of buffer to use was the effect of the potassium on flavour, since the potassium becomes increasingly noticeable at higher concentrations.

To measure the effect of the ratio of potassium carbonate to potassium bicarbonate, the pH of 4 ratios of the salts were tested. All samples had a total potassium concentration of 50 mmol/L. Ratios ranged from 0.01 to 10. Each ratio was tested in triplicate, and three pH measurements were taken for each solution following carbonation.

To measure the effect of the concentration of potassium, the pH of 7 concentrations of potassium were tested. All samples had a 1:1 ratio of potassium carbonate and potassium bicarbonate, and the potassium concentrations ranged from 0 to 150 mmol/L. Each concentration was tested in triplicate, and three pH measurements were taken of each solution following carbonation.

Flavour Masking Effect of Glycine—

While the use of the potassium salts allowed the creation of a soda with a pH higher than the critical point of erosion of enamel (pH 5.5), the addition of potassium resulted in an off flavour that rendered the drink unpalatable. Therefore, the amino acid glycine was used to mask the flavour of potassium, while adding a sweet aftertaste to the drink. Solutions containing 1% glycine were made to determine the effect of glycine on the pH. Other amino acids were also tested for their flavour masking effects, including alanine and glutamine. Both these amino acids also helped to mask the off flavour of potassium.

In view of the foregoing, a test beverage formulation including the following was prepared:

| | | |
|---|---|---|
| Potassium Carbonate | 0.621 (g/serving) | 0.207 (% w/v) |
| Potassium Bicarbonate | 0.750 (g/serving) | 0.250 (% w/v) |
| Xylitol | 9.000 (g/serving) | 3.000 (% w/v) |
| Monk Fruit Extract | 0.051 (g/serving) | 0.017 (% w/v) |
| Flavour | 0.600 (g/serving) | 0.200 (% w/v) |
| Flavour masker (obtained from Wild Flavors; product no: DBV546) | 0.060 (g/serving) | 0.020 (% w/v) |
| Glycine | 3.000 (g/serving) | 1.000 (% w/v) |
| Calcium Diphosphate | 0.030 (g/serving) | 0.010 (% w/v) |

The test beverage had a pH of about 5.97. Flavours tested included cola, root beer and pineapple.

In Vitro Testing of Hydroxyapatite Dissolution—

To determine whether or not the present test beverage would erode enamel, an in vitro experiment was performed using hydroxyapatite powder as a proxy for enamel. 10 mg of hydroxyapatite powder was placed in an Eppendorf tube along with 2 mL of beverage sample, and incubated at 37° C. for 5 mins with agitation. Then, the tubes were centrifuged for 10 mins at 12000 g, and the supernatant was analysed spectrophotometrically for phosphate using the acid-molybdate method.

The test beverage formulation was compared to a number of other beverages, including water, Club Soda, LA CROIX (sparkling water), coffee, NESTEA (iced tea), 7 UP (lemon lime soft drink), KEVITA (sparkling probiotic drink) REDBULL (energy drink), CANADA DRY (ginger ale) and COCA COLA (Cola), to determine their effect on hydroxyapatite dissolution. Samples without the addition of hydroxyapatite were also analysed for phosphate content, and the percent dissolution was calculated by the increase in phosphate with the addition of hydroxyapatite powder. The pH was also taken for each sample.

As shown in FIG. 1, the ratio of potassium carbonate to potassium bicarbonate did not affect the pH of the solutions after carbonation.

The concentration of potassium had a noticeable effect on the pH of the solution, with a positive relation between the concentration of potassium and the pH of the solution (the greater the potassium, the greater the pH). The greatest increase in pH of the samples occurred at potassium concentrations of less than 5 mmol/L. At potassium concentrations of greater than 50 mmol of potassium/L, the effect on the pH decreased.

Figure 2:
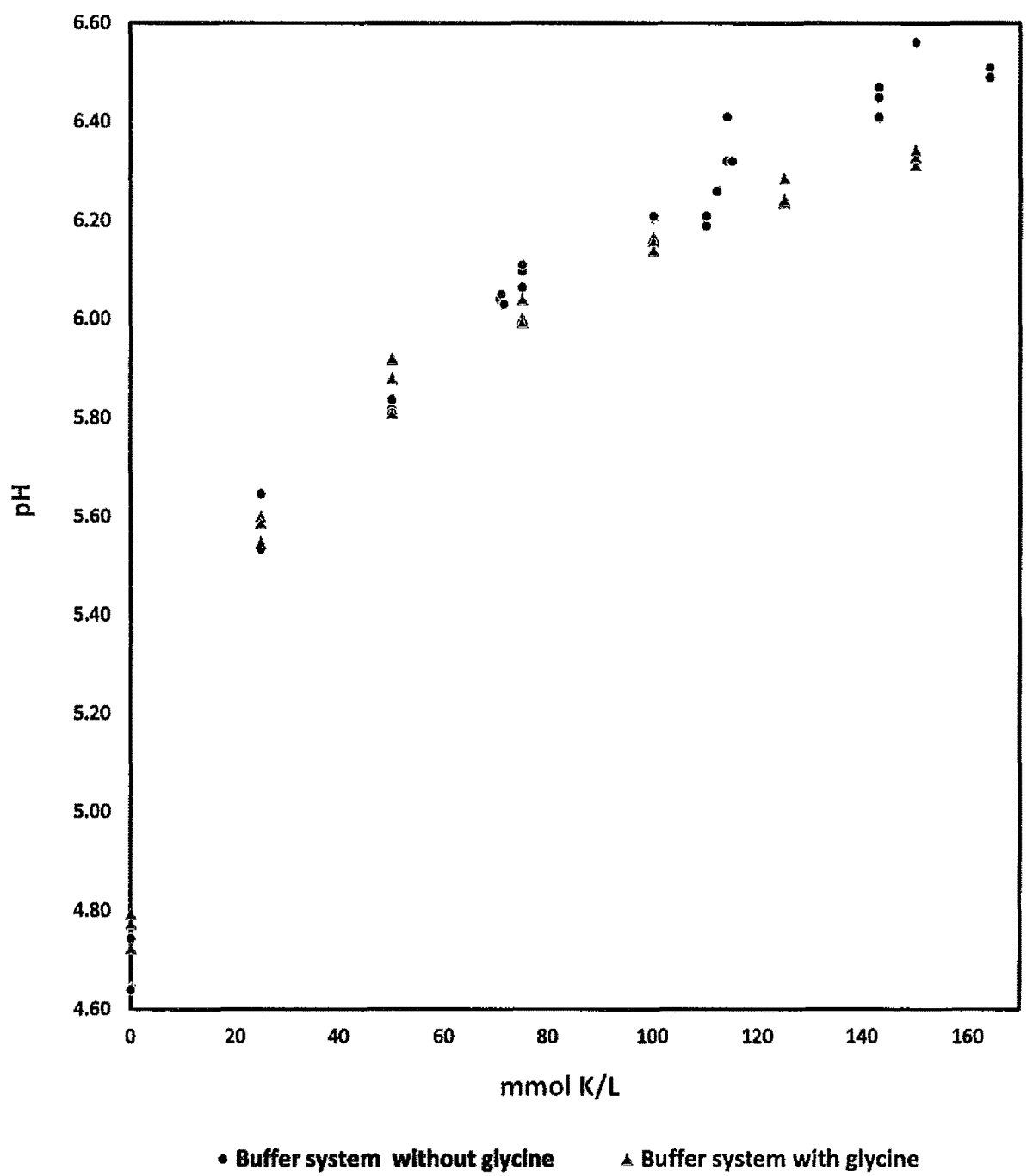
FIG. 2 graphically illustrates the effect of glycine on the pH of carbonated solutions. Solutions without glycine are represented by circles, and solutions with glycine are represented by triangles.

The addition of glycine did not have a significant effect on pH after carbonation as shown in FIG. 2. This is likely due to the isoelectric point of glycine, which is about pH 6.

Figure 3:
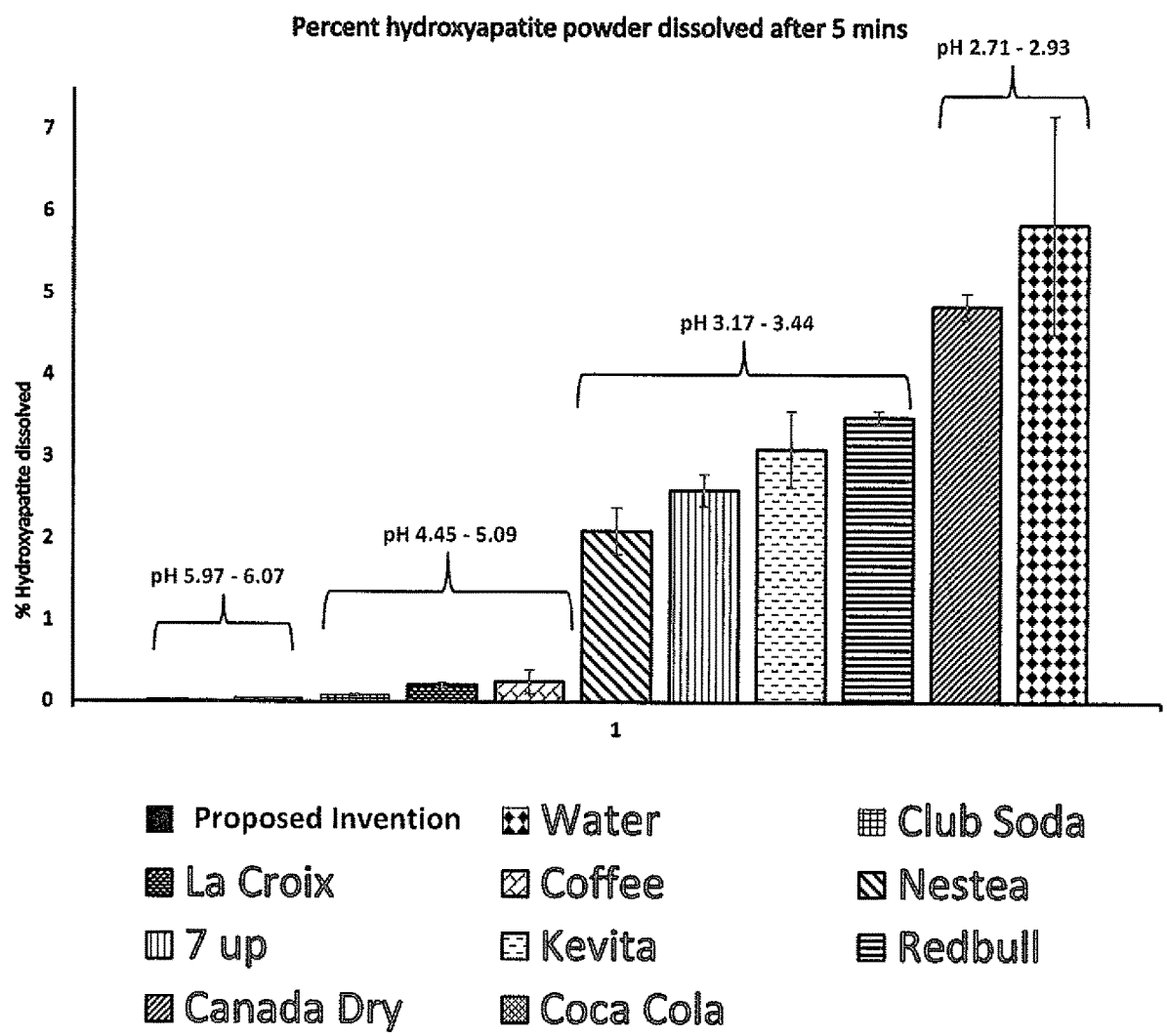
FIG. 3 graphically illustrates the effect of pH on dissolution of hydroxyapatite.

When the test beverage, prepared based on the above results, was tested, along with a number of other beverages, to determine hydroxyapatite dissolution activity (i.e. to determine effect on enamel erosion) of each, the following was observed. As expected, the concentration of hydroxyapatite dissolved correlated inversely with the pH of the samples as shown in FIG. 3. Thus, with decreasing pH, higher percentages of hydroxyapatite dissolved. The test beverage exhibited the lowest dissolution of hydroxyapatite of all the samples tested, and this was due to the combination of its higher pH and addition of dicalcium phosphate, which further prevented dissolution. Thus, the test beverage exhibited reduced cariogenic activity in comparison to other carbonated beverages.

Example 2

Another carbonated beverage formulation was also prepared as follows:

| Ingredient | g per serving | % w/v |
| --- | --- | --- |
| Potassium Carbonate | 0.621000 | 0.2070000 |
| Potassium Bicarbonate | 0.750000 | 0.2500000 |
| Glycine | 3.000000 | 1.0000000 |
| Xylitol | 9.000000 | 3.0000000 |
| Stevia Reb A 98 | 0.025800 | 0.0086000 |
| Stevia Glycosides Plus | 0.012900 | 0.0043000 |
| Oolong Tea Extract | 0.750000 | 0.2500000 |
| Vitamin D3 | 0.000005 | 0.0000017 |
| Flavour (e.g. cola, root beer or ginger ale) | 4.500000 | 1.0000000 |

The pH of this formulation was 5.7.

This formulation also exhibited reduced cariogenic activity in comparison to other carbonated beverages.

The invention claimed is:

1. A carbonated beverage comprising carbonated water, a food-grade basic buffer and at least one amino acid in an amount of about 0.5 to 2% by wt of the beverage to mask the taste of the buffer, wherein the amino acid has an isoelectric point of greater than 5.5, and the carbonated beverage has a pH of greater than 5.5.

2. The beverage of claim 1, wherein the buffer is a potassium salt.

3. The beverage of claim 1, wherein the buffer is potassium carbonate/bicarbonate.

4. The beverage of claim 1, wherein the buffer is in an amount in the range of about 25-75 mmol potassium/L of the beverage.

5. The beverage of claim 1, wherein the amino acid is selected from glycine, alanine, glutamine or combinations thereof.

6. The beverage of claim 1, wherein the amino acid is in an amount in the range of about 5 to 20 g/L of the beverage.

7. The beverage of claim 1, comprising one or more additional additives that are non-cariogenic and non-fermentable.

8. The beverage of claim 1, additionally comprising a sweetener that is non-cariogenic and non-fermentable.

9. The beverage of claim 1, having a pH of 5.6-6.0.

10. The beverage of claim 1, additionally comprising one or more of an antioxidant, a mineral or a vitamin.

11. The beverage of claim 1, comprising an antioxidant and vitamin D.

12. The beverage of claim 1, comprising: i) a buffer of potassium carbonate and potassium bicarbonate; ii) the amino acid, glycine; iii) sweetener comprising xylitol and steviol glycosides, an antioxidant, vitamin D and a flavouring agent.

13. The beverage of claim 1, comprising: i) a buffer of potassium carbonate and potassium bicarbonate; ii) the amino acid, glycine; iii) a sweetener comprising xylitol and a flavouring agent.

14. The beverage of claim 1, comprising about 95% by wt carbonated water.

15. A carbonated beverage comprising carbonated water, a food-grade basic buffer and at least one amino acid selected from glycine, alanine, glutamine or combinations thereof in an amount of about 0.5 to 2% by wt of the beverage to mask the taste of the buffer, wherein the carbonated beverage has a pH of greater than 5.5.

16. The beverage of claim 15, wherein the buffer is potassium salt.

17. The beverage of claim 15, wherein the buffer is potassium carbonate/bicarbonate.

18. The beverage of claim 15, wherein the buffer is in an amount in the range of about 25-75 mmol potassium/L of the beverage.

19. The beverage of claim 15, having a pH of 5.6-6.0.

* * * * *